(12) United States Patent
Hosoda

(10) Patent No.: US 8,086,802 B2
(45) Date of Patent: Dec. 27, 2011

(54) INSTRUCTION CACHE SYSTEM, INSTRUCTION-CACHE-SYSTEM CONTROL METHOD, AND INFORMATION PROCESSING APPARATUS

(75) Inventor: Soichiro Hosoda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 446 days.

(21) Appl. No.: 12/435,023

(22) Filed: May 4, 2009

(65) Prior Publication Data
US 2010/0077146 A1 Mar. 25, 2010

(30) Foreign Application Priority Data

Sep. 19, 2008 (JP) ................. 2008-241194

(51) Int. Cl.
*G06F 13/00* (2006.01)
(52) U.S. Cl. ...................... 711/118; 711/125
(58) Field of Classification Search .............. 711/118, 711/125, 128, 154, 170
See application file for complete search history.

(56) References Cited

U.S. PATENT DOCUMENTS

| 5,465,342 | A | 11/1995 | Walsh | |
|---|---|---|---|---|
| 6,173,381 | B1* | 1/2001 | Dye | 711/170 |
| 7,243,191 | B2* | 7/2007 | Ying et al. | 711/118 |
| 7,512,750 | B2* | 3/2009 | Newburn et al. | 711/154 |
| 2003/0135694 | A1* | 7/2003 | Naffziger et al. | 711/118 |

FOREIGN PATENT DOCUMENTS

JP 6-231044 8/1994
* cited by examiner

*Primary Examiner* — Vu Le
(74) *Attorney, Agent, or Firm* — Oblon, Spivak, McClelland, Maier & Neustadt, L.L.P.

(57) ABSTRACT

An instruction cache system includes an instruction-cache data storage unit that stores cache data per index, and an instruction cache controller that compresses and writes the cache data in the instruction-cache data storage unit, and controls a compression ratio of the written cache data. The instruction cache controller calculates a memory capacity of a redundant area generated due to compression in a memory area belonging to an index, in which n pieces of cache data are written based on the controlled compression ratio, to compress and write new cache data in the redundant area based on the calculated memory capacity.

20 Claims, 4 Drawing Sheets

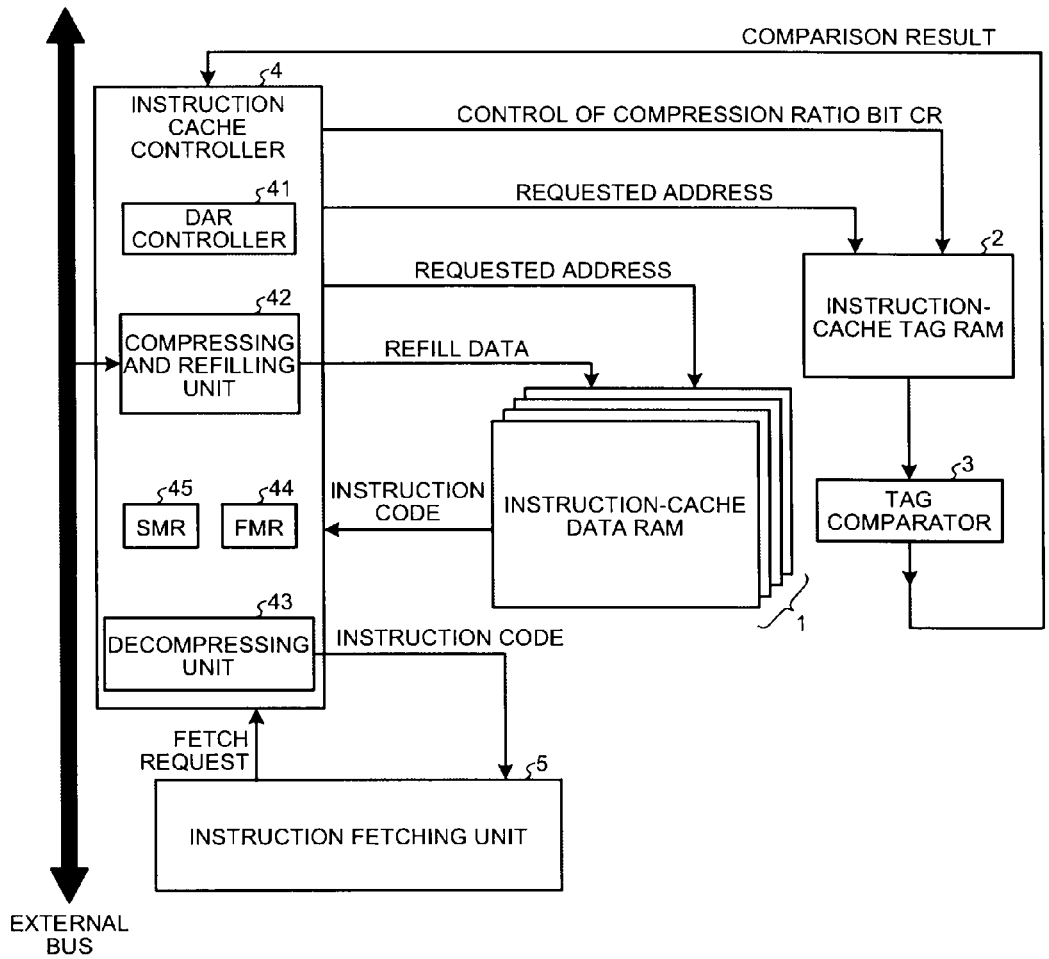
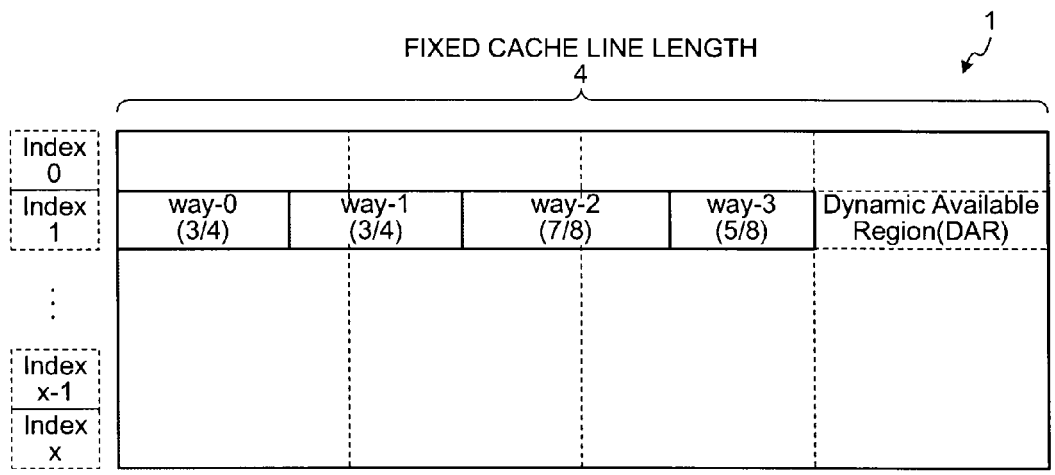

FIG.3

| | way-0 | | | | way-1 | | | way-2 | | | way-3 | | | DAR | | | |
|---|---|---|---|---|---|---|---|---|---|---|---|---|---|---|---|---|---|
| Index 0 | R | V | CR | Tag Info. | V | CR | Tag Info. | V | CR | Tag Info. | V | CR | Tag Info. | V | P | CR | Tag Info. |
| Index 1 | R | V | CR | Tag Info. | V | CR | Tag Info. | V | CR | Tag Info. | V | CR | Tag Info. | V | P | CR | Tag Info. |
| ⋮ | | | | | | | | | | | | | | | | | |
| Index x-1 | R | V | CR | Tag Info. | V | CR | Tag Info. | V | CR | Tag Info. | V | CR | Tag Info. | V | P | CR | Tag Info. |
| Index x | R | V | CR | Tag Info. | V | CR | Tag Info. | V | CR | Tag Info. | V | CR | Tag Info. | V | P | CR | Tag Info. |

FIG.4

| | | | | | | | | | | | | | | | | | |
|---|---|---|---|---|---|---|---|---|---|---|---|---|---|---|---|---|---|
| Index 0 | R | 0 | - | - | 0 | - | - | 0 | - | - | 0 | - | - | 0 | - | - | - |
| Index 1 | 2 | 1 | 3/4 | Tag Info. (way-0) | 1 | 3/4 | Tag Info. (way-1) | 1 | 7/8 | Tag Info. (way-2) | 1 | 5/8 | Tag Info. (way-3) | 0 | - | - | - |
| ⋮ | | | | | | | | | | | | | | | | | |
| Index x-1 | R | 0 | - | - | 0 | - | - | 0 | - | - | 0 | - | - | 0 | - | - | - |
| Index x | R | 0 | - | - | 0 | - | - | 0 | - | - | 0 | - | - | 0 | - | - | - |

INSTRUCTION CACHE SYSTEM, INSTRUCTION-CACHE-SYSTEM CONTROL METHOD, AND INFORMATION PROCESSING APPARATUS

CROSS-REFERENCE TO RELATED APPLICATIONS

This application is based upon and claims the benefit of priority from the prior Japanese Patent Application No. 2008-241194, filed on Sep. 19, 2008; the entire contents of which are incorporated herein by reference.

BACKGROUND OF THE INVENTION

1. Field of the Invention

The present invention relates to an instruction cache system, an instruction-cache-system control method, and an information processing apparatus that adopt a set associative system.

2. Description of the Related Art

Conventionally, to improve a hit ratio of an instruction cache, a set associative system using a plurality of ways has been mainly adopted in instruction cache systems in which the instruction cache is placed in a processor. In the instruction cache system adopting the conventional set associative system, there is a problem in that it is difficult to expand the ways after the instruction cache is once installed in the processor. For example, a technique enabling to increase the number of ways temporarily at the time of operation is disclosed in Japanese Patent Application Laid-Open No. H6-231044. However, with this technique, auxiliary caches need to be arranged beforehand, which is considerably disadvantageous in view of the installing area and cost.

Further, when an instruction code is prefetched in the conventional instruction cache system, there is a problem in that any of cache lines needs to be removed from the instruction cache or a separate buffer memory for prefetch needs to be arranged near the instruction cache.

BRIEF SUMMARY OF THE INVENTION

An instruction cache system according to an embodiment of the present invention comprises: an instruction-cache data storage unit that stores cache data per index; and an instruction cache controller that compresses and writes cache data in the instruction-cache data storage unit, and controls a compression ratio of the written cache data, wherein the instruction cache controller calculates a memory capacity of a redundant area generated due to compression in a memory area belonging to an index, in which n pieces of cache data are written based on the controlled compression ratio, to compress and write new cache data in the redundant area based on the calculated memory capacity.

An instruction-cache-system control method according to an embodiment of the present invention comprises: controlling including compressing and writing cache data in the instruction-cache data storage unit, and controlling a compression ratio of the written cache data, and calculating a memory capacity of a redundant area generated due to compression in a memory area belonging to an index, in which n pieces of cache data are written based on the controlled compression ratio, to compress and write new cache data in the redundant area based on the calculated memory capacity.

An information processing apparatus according to an embodiment of the present invention comprises: an instruction cache system adopting an n-way set associative system in which an instruction code is cached as cache data; and a main memory that supplies an instruction code to the instruction cache system, wherein the instruction cache system comprises: an instruction-cache data storage unit that stores cache data per index; and an instruction cache controller that compresses and writes the cache data in the instruction-cache data storage unit, and controls a compression ratio of the written cache data, and wherein the instruction cache controller calculates a memory capacity of a redundant area generated due to compression in a memory area belonging to an index, in which n pieces of cache data are written based on the controlled compression ratio, to compress and write new cache data in the redundant area based on the calculated memory capacity.

BRIEF DESCRIPTION OF THE DRAWINGS

FIG. 1 depicts a configuration of an instruction cache system according to a first embodiment of the present invention;

FIG. 2 is a schematic diagram for explaining a configuration example of an instruction-cache data RAM;

FIG. 3 is a schematic diagram for explaining a configuration example of an instruction-cache tag RAM;

FIG. 4 is a schematic diagram for explaining a state of the instruction-cache tag RAM;

DETAILED DESCRIPTION OF THE INVENTION

Figure 5:
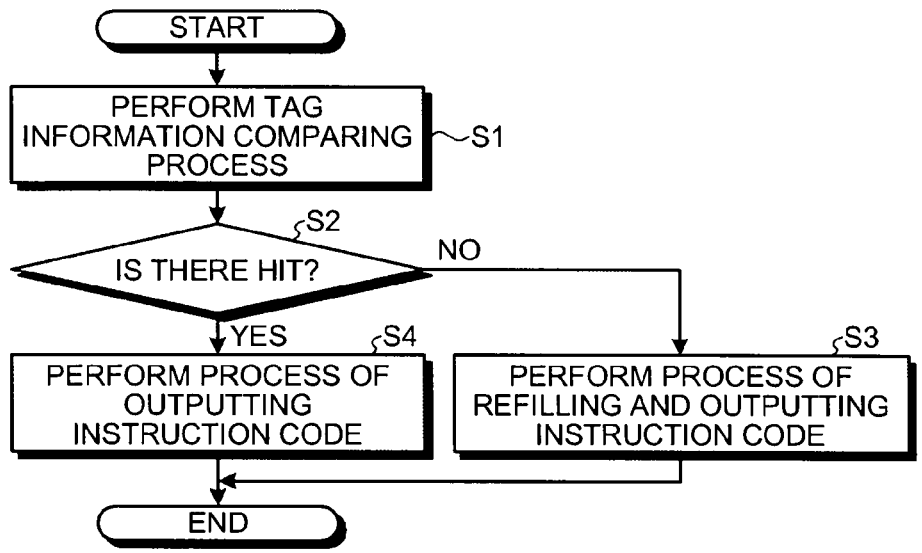
FIG. 5 is a flowchart for explaining a first operation performed by the instruction cache system according to the first embodiment.

Exemplary embodiments of an instruction cache system, an instruction-cache-system control method, and an information processing apparatus according to the present invention will be explained below in detail with reference to the accompanying drawings. The present invention is not limited to the embodiments.

An instruction cache system according to a first embodiment of the present invention is explained, assuming that it adopts a set associative system in which four ways are originally set; however, the present invention can be applied to the instruction cache system adopting the set associative system having a plurality of ways other than four, based on an outline explained below, by persons skilled in the corresponding technique. Therefore, the following explanations should be understood broadly as contents disclosed with respect to the corresponding technical field, and the present invention is not limited to the explanations.

FIG. 1 is a block diagram of a configuration of the instruction cache system according to the first embodiment. In FIG. 1, the instruction cache system according to the first embodiment includes an instruction-cache data random access memory (RAM) 1 that stores instruction codes per cache line in a compressed state, an instruction-cache tag RAM 2 that stores tag information of respective cache lines stored in the instruction-cache data RAM 1 together with a compression ratio bit indicating a compression ratio of each cache line, an instruction cache controller 4 that controls the entire instruction cache system, a tag comparator 3 that compares tag information of an address received from the instruction cache controller 4 with the tag information read from the instruction-cache tag RAM 2 and outputs a comparison result to the instruction cache controller 4, and an instruction fetching unit 5 that transmits a fetch request to the instruction cache controller 4 based on a request from a processor to obtain an instruction code.

The instruction cache controller 4 includes a DAR controller 41 that manages the compression ratio bit or the like stored in the instruction-cache tag RAM 2, which is information bit for managing a dynamic available region (DAR) formed in the instruction-cache data RAM 1 due to compression of the instruction code per cache line, a compressing and refilling unit 42 that compresses the instruction code per cache line obtained from a main memory (not shown) or the like via an external bus and writes the instruction code in the instruction-cache data RAM 1, a decompressing unit 43 that decompresses the compressed instruction code obtained from the instruction-cache data RAM 1 to transmit the instruction code to the instruction fetching unit 5, a fill mode register (FMR) 44 that stores setting information for controlling the DAR, and a speculative mode register (SMR) 45.

A configuration example of the instruction-cache data RAM 1 is explained. FIG. 2 is a schematic diagram for explaining a configuration example of the instruction-cache data RAM 1. In the configuration example in FIG. 2, the instruction-cache data RAM 1 is configured so that a plurality of compressed instruction codes per cache line can be stored with respect to each index (hereinafter, instruction code per cache line to be written in the instruction-cache data RAM1 is simply referred to as cache data). The index corresponds to a value of lower bits of an address, and for example, when lower-order 6 bits are used as the index, the index takes a value of from 0 to 63. In FIG. 2, this is displayed as Index 0 to Index x. A memory area belonging to each index of the instruction-cache data RAM 1 has a memory capacity of a cache line length before compression (hereinafter, "fixed cache line length") by 4 corresponding to the 4-way set associative system originally adopted in the first embodiment. Because pieces of cache data stored in the instruction-cache data RAM 1 are respectively compressed and written by the compressing and refilling unit 42, the memory area belonging to each index has a redundant area even after the pieces of cache data for four ways, that is, way-0 to way-3 are stored. The redundant area is the DAR. The DAR is used as an area for storing the cache data of a new way, that is, way-4 or prefetched cache data.

In the configuration example shown in FIG. 2, pieces of cache data of way-0, way-1, way-2, and way-3 compressed respectively into 3/4, 3/4, 7/8, and 5/8 of the fixed cache line length are stored in the memory area of Index 1, and there is the DAR having a memory capacity of 1 fixed cache line length.

A configuration of the instruction-cache tag RAM 2 is explained next. FIG. 3 is a schematic diagram for explaining a configuration example of the instruction-cache tag RAM 2. Each index includes replace bit R for instructing the way to be refilled next, valid bit V indicating whether data to be stored in a tag information field is effective as tag information, compression ratio bit CR indicating a compression ratio of the cache data, prefetch bit P indicating whether the data stored in the DAR is the prefetched cache data, and the tag information field for storing the tag information. The replace bit R is set to the respective indexes, the valid bit V, the compression ratio bit CR, and the tag information field are respectively set to each way, and the valid bit V, the compression ratio bit CR, the prefetch bit P, and the tag information field are respectively set to the DAR.

The compression ratio bit CR indicates a ratio of the size of the cache data after compression with respect to the fixed cache line length, and includes the number of bits corresponding to a resolution of the compression ratio. The resolution of the compression ratio is assumed to be 1/8, and the compression ratio bit CR has a 3-bit configuration. For example, when the cache data is compressed into 5/8 of the fixed cache line length, it is expressed as "100". The compression ratio bit CR can be in any format so long as the ratio of the size of the cache data after compression to the fixed cache line length can be expressed, and the resolution of the compression ratio, the configuration of the compression ratio bit CR, and the format expressing the compression ratio are not limited to the example mentioned above.

The prefetch bit P has, for example, a 1-bit configuration, and indicates "0" when the cache data stored in the DAR is data of a new way, that is, way-4, or "1" when the cache data is the prefetched cache data belonging to the next index.

The valid bit V has, for example, a 1-bit configuration, and indicates "0" when data to be stored is invalid as the tag information, or "1" when the data is valid as the tag information.

The replace bit R has a bit configuration corresponding to the number of ways. Because the 4-way set associative system is adopted here, and one new way may be added in the DAR, the replace bit R has, for example, 3-bit configuration to indicate cache data for removing any one of the five ways in total including the way stored in the DAR. For example, when way-0 is to be refilled next, "000" is indicated, and when way-3 is to be refilled next, "011" is indicated. When cache data of way-4 is stored in the DAR and way-4 is to be refilled next, "100" is indicated.

As a refill policy, Least Recently Used (LSU) for removing cache data, which is the oldest used data, or Least Recently Replaced (LRR) for removing cache data, which is the oldest refilled data, are known, and these policies can be used. However, to increase the memory capacity of the DAR efficiently, Least Compression Ratio (LCR), which is a policy for removing cache data having the lowest compression ratio, that is, having the largest size after compression, based on a value of the compression ratio bit CR is used here.

FIG. 4 is a schematic diagram for explaining a state of the instruction-cache tag RAM 2 corresponding to the example of the instruction-cache data RAM 1 shown in FIG. 2. In FIG. 4, for easy understanding, values of the replace bit R and the compression ratio bit CR are expressed in decimal notation. Because pieces of cache data are stored in way-0 to way-3 in the instruction-cache data RAM 1, as shown in the figure, the valid bit V of way-0 to way-3 is 1 in a line of Index 1. Further, the compression ratio bit CR of way-0 to way-3 respectively indicate 3/4, 3/4, 7/8, and 5/8 corresponding to the compression ratio of the respective cache data. According to LCR, because way-2 having the lowest compression ratio is removed first, the replace bit R in Index 1 indicates 2.

An operation of the first embodiment according to the present invention having such a configuration is explained next. In the first embodiment, different operations are respectively performed based on whether it is set to perform prefetch. An operation when it is set not to perform prefetch (hereinafter, "first operation") is explained first. Setting whether to perform prefetch is described in the setting information stored in the FMR 44, and the instruction cache controller 4 refers to the FMR 44 to determine whether to perform the first operation or a second operation described later.

FIG. 5 is a flowchart for explaining the first operation performed by the instruction cache system according to the first embodiment. In FIG. 5, when an address of the instruction code is requested from the processor, a tag information comparing process is executed for comparing the tag information at the address with the tag information stored in the instruction-cache tag RAM 2 (Step S1). That is, the requested address is provided to the instruction cache controller 4 via the instruction fetching unit 5. The instruction-cache tag RAM 2 reads the tag information specified by the index of the address from the instruction cache controller 4. The tag comparator 3 compares the read tag information with the requested tag information at the address, and outputs a comparison result to the instruction cache controller 4. The instruction-cache tag RAM 2 and the tag comparator 3 output values of the respective information bits of the respective ways of the index to the instruction cache controller 4, together with the comparison result of the tag information specified by the index of the requested address.

Subsequently, when any one of the tag information read from the instruction-cache tag RAM 2 matches (hits) the tag information of the requested address in the comparison result (YES at Step S2), the instruction cache controller 4 proceeds to a process of outputting the instruction code (Step S4). That is, the instruction-cache data RAM 1 reads the cache data corresponding to the way of the hit tag information of the pieces of compressed cache data to be specified by the index of the requested address from the instruction-cache data RAM 1 to transmit the cache data to the instruction cache controller 4. The decompressing unit 43 decompresses the transmitted compressed cache data to output the data to the instruction fetching unit 5.

When any tag information read from the instruction-cache tag RAM 2 does not match the tag information of the requested address in the comparison result obtained at Step S1 (cache miss) (NO at Step S2), the instruction cache system refills the requested instruction code (Step S3). When the memory area of the DAR has a value equal to or larger than a predetermined threshold, the instruction cache system uses the DAR as an area for storing the cache data of way-4.

That is, the instruction cache controller 4 calculates the memory capacity of the DAR based on the value of the comparison ratio bit CR obtained together with the comparison result at Step S1. The predetermined threshold is a value stored in the SMR 45 as the setting information for determining whether to use the DAR as a new way, and for example, a value of 1 fixed cache line length or a value of 0.9 the fixed cache line length is set. The instruction cache controller 4 compares the value of the SMR 45 with the memory capacity of the DAR obtained by calculation.

When the capacity of the memory area of the DAR is equal to or larger than the value of the SMR 45 and the cache data is not stored in the DAR, the compressing and refilling unit 42 obtains the cache data of the instruction code to be refilled via the external bus, and compresses the obtained cache data to store the cache data in the DAR. When the capacity of the memory area of the DAR is equal to or larger than the value of the SMR 45 and the DAR has already stored the cache data of way-4, or when the capacity of the memory area of the DAR is smaller than the value of the SMR 45, the compressing and refilling unit 42 obtains and compresses the cache data to be refilled, and refills the cache data in the way indicated by the replace bit R. The DAR controller 41 obtains the compression ratio of the cache data compressed by the compressing and refilling unit 42 at the time of a refill process and updates the CR bit of the way in which the obtained compression ratio is refilled.

The obtained cache data is output from the decompressing unit 43 to the instruction fetching unit 5 in an uncompressed state.

Figure 6:
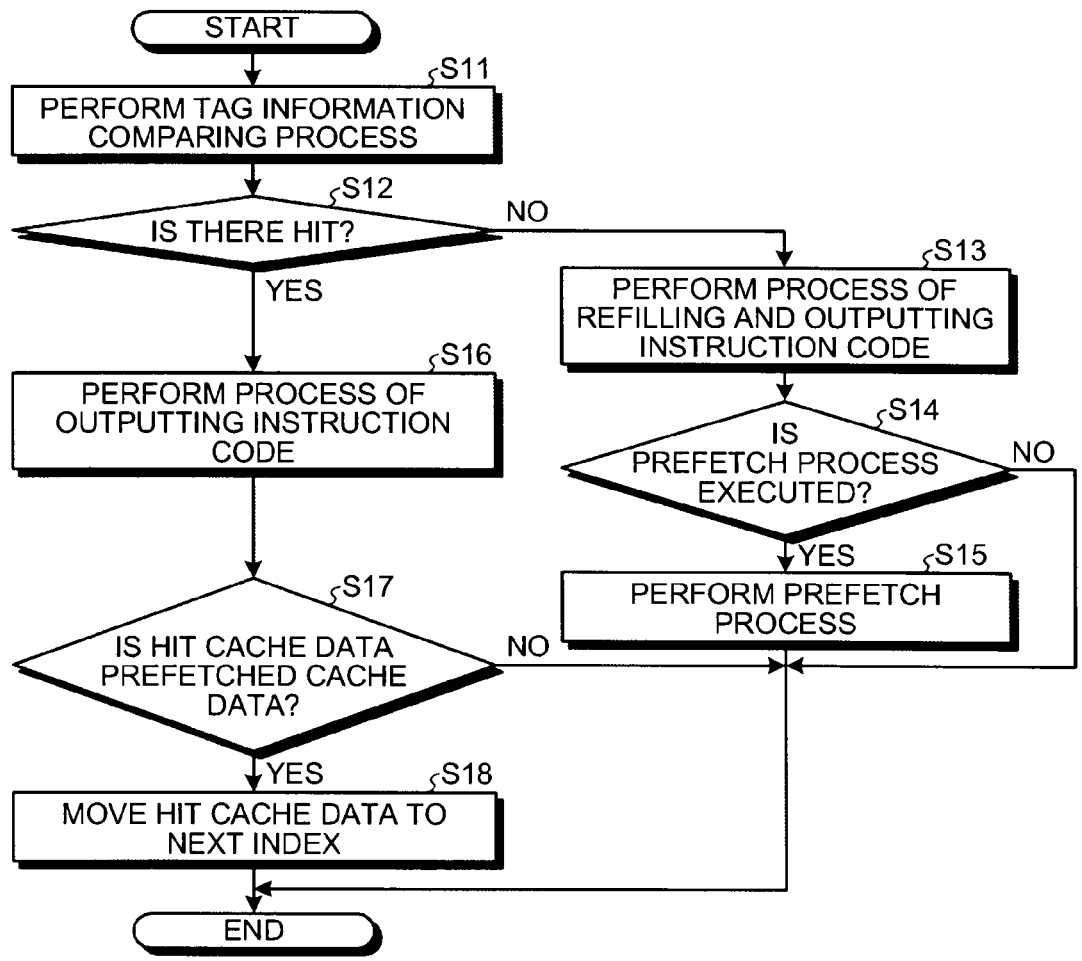
FIG. 6 is a flowchart for explaining a second operation performed by the instruction cache system according to the first embodiment.

An operation when the FMR 44 sets to perform prefetch (second operation) is explained next. In the second operation, at the time of a cache miss, cache data of an address adjacent to the cache data having the cache miss is obtained beforehand (prefetched) and stored in the DAR. FIG. 6 is a flowchart for explaining the second operation.

In FIG. 6, at Step S11, a process of comparing the tag information to be stored in the instruction-cache tag RAM 2 with the tag information of the requested address is performed as in the operation at Step S1. In the process, the instruction cache controller 4 transmits an address to the instruction-cache tag RAM 2 to read the tag information specified by the index of the address from the instruction cache controller 4 and the tag information in the prefetched cache line when the prefetched cache data is stored in the DAR of an index one before the index. It is determined whether the prefetched cache data is stored according to whether the tag information, in which the prefetch bit P is set as "1" in the DAR of the previous index, is stored.

When there is a cache miss (NO at Step S12), the instruction cache controller 4 obtains the cache data of the cache-missed instruction code, and the compressing and refilling unit 42 compresses and refills the obtained cache data in the way indicated by the replace bit R (Step S13).

When the cache data of way-4 has been already stored in the DAR and the replace bit R indicates way-4, the compressing and refilling unit 42 removes cache data, in which the compression ratio bit CR indicates a large value, of way-0 to way-3 based on the LCR policy, and refills the obtained cache data in the removed way of way-0 to way-3.

The DAR controller 41 updates the compression ratio bit CR of the refilled cache data. The refilled cache data is output from the decompressing unit 43 to the instruction fetching unit 5 in an uncompressed state.

Subsequently, the instruction cache controller 4 determines whether to execute the prefetch process based on whether such conditions that the memory area of the DAR has a memory capacity equal to or larger than the value set by the SMR 45 and the cache data of the instruction code belonging to an index next to the refilled cache data is not stored in the next index originally are satisfied (Step S14). When these conditions are satisfied, the instruction cache controller 4 determines to execute the prefetch process (YES at Step S14), and proceeds to Step S15. When these conditions are not satisfied, the instruction cache controller 4 determines not to execute the prefetch process (NO at Step S14), and finishes the second operation.

In the prefetch process at Step S15, the instruction cache controller 4 prefetches cache data having an address adjacent to that of the refilled cache data, and the compressing and refilling unit 42 compresses and writes the prefetched cache data in the DAR. The DAR controller 41 sets the prefetch bit P of the DAR to "1", to update the compression ratio bit CR of the DAR. After Step S15, the second operation finishes.

When there is a hit in the comparison result at Step S11 (YES at Step S12), in the instruction cache controller 4, the hit cache data corresponding to the way of the tag information is read from the instruction-cache data RAM 1 and transmitted to the decompressing unit 43, which decompresses the transmitted compressed cache data and outputs the cache data to the instruction fetching unit 5 (Step S16).

Subsequently, the instruction cache controller 4 determines whether the hit cache data is the prefetched cache data (Step S17). When the hit cache data is the prefetched cache data (YES at Step S17), the instruction cache controller 4 moves the hit cache data from the DAR of the index, in which the cache data is currently stored, to the DAR of the next index (Step S18). When there is no sufficient capacity for storing the hit cache data in the memory area of the DAR at the destination, the instruction cache controller 4 removes the cache data of the way indicated by the replace bit R to generate an area to store the hit cache data, and moves the hit cache data to the generated area.

As described above, according to the first embodiment, because the instruction cache controller 4 compresses and writes the cache data in the instruction-cache data RAM 1, the DAR as a generated redundant area can be used. Accordingly, the instruction cache system that can add a way and store the prefetched cache data without having an auxiliary cache can be provided. According to the first embodiment, further, when it is set not to perform prefetch, ways exceeding the originally set number of ways can be used by also storing the cache data belonging to the same index in the DAR. That is, ways can be expanded. Further, when it is set to perform prefetch, because the cache data belonging to the prefetched next index can be further stored in the DAR, the prefetch function can be used without removing any cache line from the instruction cache or providing another buffer memory for prefetch near the instruction cache.

In the above explanations, a compression method performed by the compressing and refilling unit 42 has not been mentioned. However, any method can be used so long as the method can downsize the cache data of the instruction code. For example, a compression method for converting a comparatively simple instruction code such as a no operation (NOP) instruction or a part of the instruction code into a special bit flag can be used.

At Step S15, cache data having an address adjacent to that of the cache data to be refilled is prefetched at the time of a cache miss; however, the address of the prefetch destination is not limited thereto. Further, when the cache data to be prefetched is stored in the next index, the instruction cache controller 4 can store the cache data to be refilled in the DAR.

An instruction cache system in a second embodiment of the present invention is explained next. Generally, the instruction-cache data RAM 1 has such a configuration that a memory area belonging to one index is stored over the RAM divided into a plurality of memory banks. At the time of reading the cache data to be read from the instruction-cache data RAM 1, if the instruction cache controller 4 supplies power to all banks to activate these, banks not including the cache data to be read are also activated, which is a waste of power. According to the second embodiment, when the cache data is read from the instruction-cache data RAM 1, the instruction cache controller 4 specifies the memory bank that stores the cache data to be read based on the value of the compression ratio bit CR, and activates only the specified memory bank.

Figure 7:
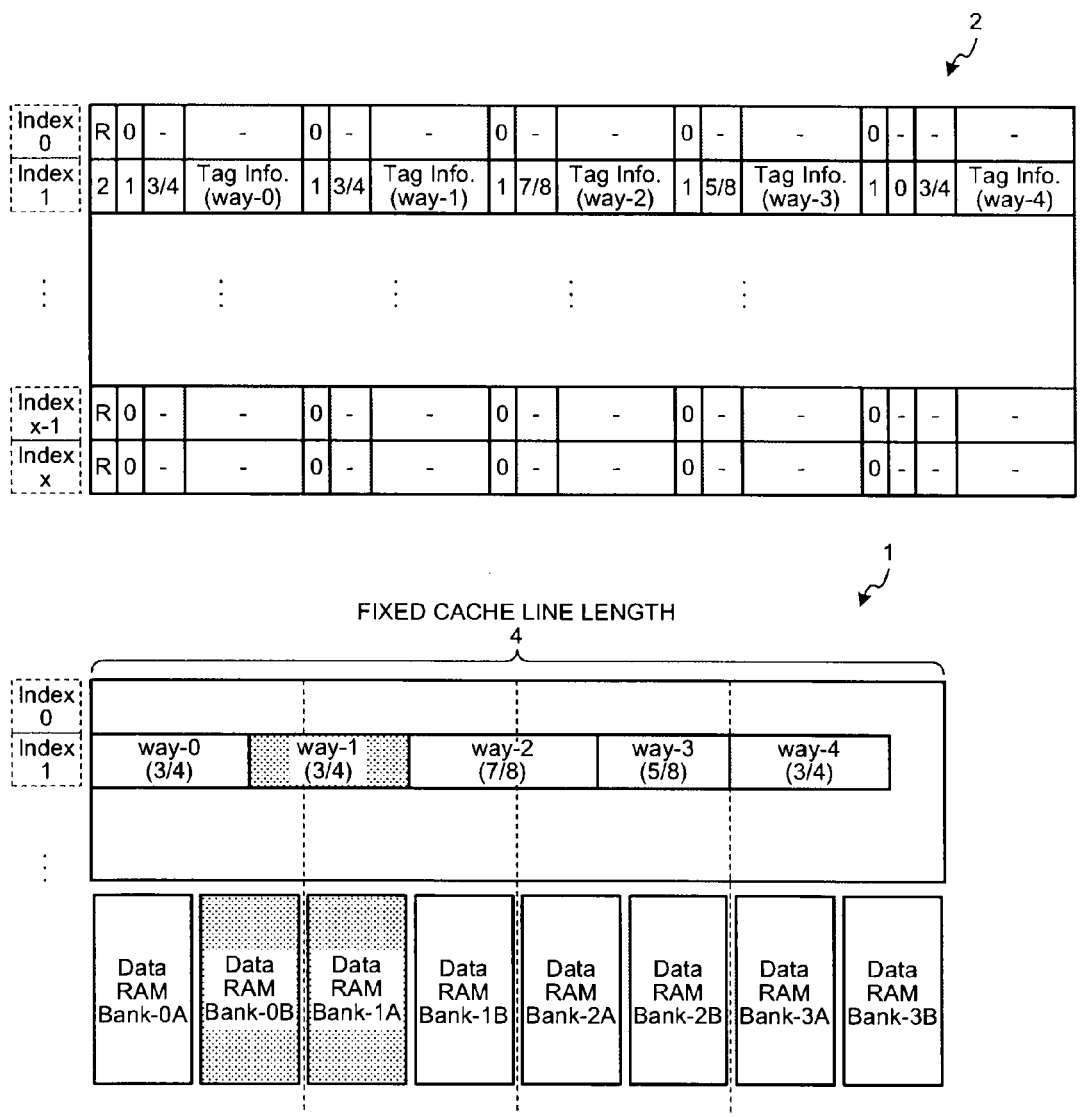
FIG. 7 is a schematic diagram for explaining a configuration example of an instruction-cache data RAM and an instruction-cache tag RAM in an instruction cache system according to a second embodiment of the present invention.

For example, as shown in FIG. 7, in the instruction-cache data RAM 1, it is assumed that a memory area belonging to one index includes banks Bank-0A, Bank-0B, Bank-1A, Bank-1B, Bank-2A, Bank-2B, Bank-3A, and Bank-3B that can store data of half the length of the fixed cache line length, and pieces of cache data of the respective indexes are stored in the banks Bank-0A to Bank-3B sequentially from the cache data of way-0 without having a blank area between the pieces of cache data. In the instruction-cache data RAM 1 having such a configuration, it is assumed that the pieces of cache data of way-0 to way-4 are respectively compressed into 3/4, 3/4, 7/8, 5/8, and 3/4 of the fixed cache line length and stored.

It is assumed that way-1 of Index 1 is hit at Step S2 or S12. When control proceeds to Step S4 or S16, because the instruction cache controller 4 recognizes that the compression ratio of respective pieces of cache data of Index 1 is 3/4, 3/4, 7/8, 5/8, and 3/4 in order from way-0 based on the compression ratio bit CR, the instruction cache controller 4 knows that the pieces of cache data to be read of way-1 are stored in from about ½ of the bank Bank-0B to over the entire bank Bank-1A. The instruction cache controller 4 then activates only the banks Bank-0B and Bank-1A, and outputs the target cache data from the instruction-cache data RAM 1.

Thus, according to the second embodiment, when the requested cache data is hit, the instruction cache controller 4 specifies the memory bank, in which the hit cache data is written, based on the compression ratio information to activate the specified memory bank. Accordingly, power is supplied only to the memory bank that stores the requested cache data, thereby enabling to realize the instruction cache system having low power consumption.

In the above explanations, the configuration of the memory bank is such that the instruction-cache data RAM 1 includes eight banks that can store data of half the length of the fixed cache line length per index. However, the data length stored by one memory bank and the number of memory banks constituting the instruction-cache data RAM are not limited thereto.

A third embodiment of the present invention is explained next. According to the first embodiment, when the DAR of an index to be specified by a requested address has a memory capacity equal to or larger than a value set in the SMR 45, a cache line is newly stored in the DAR of the index, whereas DARs of a plurality of indexes are combined and used as one DAR in the third embodiment.

Specifically, the instruction cache controller 4 has an index set register (ISR), which indicates a DAR of which index is combined with a DAR of which index. The instruction cache controller 4 uses the DAR virtually combined into one by the ISR as an area for storing the cache line of the new way or the prefetched cache data, based on setting by the FMR 44.

According to the third embodiment, the instruction cache controller 4 virtually combines the DARs generated in a plurality of memory areas based on the controlled compression ratio, and compresses and writes the new cache data in the combined DAR. Accordingly, the DAR generated due to compression of cache data can be efficiently used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An instruction cache system adopting an n-way set associative system in which an instruction code is cached as cache data, wherein the instruction cache system comprises:
   an instruction-cache data storage unit that stores cache data per index; and
   an instruction cache controller that compresses and writes cache data in the instruction-cache data storage unit, and controls a compression ratio of the written cache data, wherein
   the instruction cache controller calculates a memory capacity of a redundant area generated due to compression in a memory area belonging to an index, in which n pieces of cache data are written based on the controlled compression ratio, to compress and write new cache data in the redundant area based on the calculated memory capacity.

2. The instruction cache system according to claim 1, wherein the new cache data written in the redundant area is cache data belonging to a same index, or prefetched cache data belonging to a next index.

3. The instruction cache system according to claim 2, wherein when cache data requested from a processor hits the prefetched cache data, the instruction cache controller determines whether the redundant area in the memory area of an index next to the index in the memory area storing the cache data has a memory capacity capable of being written the hit cache data therein, based on the controlled compression ratio, and when the redundant area of the next index has the memory capacity capable of being written the hit cache data therein, the instruction cache controller moves the cache data to the redundant area of the next index, and when the redundant area of the next index does not have the memory capacity capable of being written the hit cache data therein, deletes the cache data stored in the memory area of the next index to generate an area capable of being written the hit cache data therein, and moves the hit cache data to the generated area.

4. The instruction cache system according to claim 3, wherein the instruction cache controller determines whether the hit cache data can be written in the redundant area by comparing the memory capacity of the redundant area with a preset threshold.

5. The instruction cache system according to claim 4, wherein the instruction cache controller includes a threshold storage unit that stores setting of the threshold.

6. The instruction cache system according to claim 2, wherein the instruction cache controller determines whether to write the cache data belonging to the same index or to write the prefetched cache data belonging to the next index, based on a preset operation mode.

7. The instruction cache system according to claim 6, wherein the instruction cache controller has an operation-mode-setting storage unit that stores setting of the operation mode.

8. The instruction cache system according to claim 1, wherein in a case of refilling cache data, if a memory area of the index does not have a memory capacity capable of being written the cache data to be refilled therein, the instruction cache controller deletes cache data having a largest size after compression based on the controlled compression ratio to generate an area capable of being written the cache data therein.

9. The instruction cache system according to any one of claims 1 to 3, wherein a memory area of the instruction-cache data storage unit is divided into a plurality of memory banks, and
when requested cache data is hit, the instruction cache controller specifies a memory bank in which the hit cache data is written based on the controlled compression ratio, thereby activating the specified memory bank.

10. The instruction cache system according to claim 1, wherein the instruction cache controller virtually couples redundant areas generated in a plurality of memory areas based on the controlled compression ratio, and compresses and writes new cache data in the coupled areas.

11. The instruction cache system according to claim 1, further comprising a tag-information storage unit that stores tag information corresponding to cache data stored in the instruction-cache data storage unit, wherein
the instruction cache controller causes the tag-information storage unit to store compression ratios of respective pieces of cache data stored in the instruction-cache data storage unit.

12. An instruction-cache-system control method for controlling an instruction cache system, which adopts an n-way set associative system in which an instruction code is cached as cache data, and comprises an instruction-cache data storage unit that stores cache data per index, wherein the method comprises:
controlling including compressing and writing cache data in the instruction-cache data storage unit, and controlling a compression ratio of the written cache data, and
calculating a memory capacity of a redundant area generated due to compression in a memory area belonging to an index, in which n pieces of cache data are written based on the controlled compression ratio, to compress and write new cache data in the redundant area based on the calculated memory capacity.

13. The instruction-cache-system control method according to claim 12, wherein the new cache data written in the redundant area is cache data belonging to a same index, or prefetched cache data belonging to a next index.

14. The instruction-cache-system control method according to claim 13, comprising:
when cache data requested from a processor hits the prefetched cache data, determining whether the redundant area in the memory area of an index next to the index in the memory area storing the cache data has a memory capacity capable of being written the hit cache data therein, based on the controlled compression ratio, and when the redundant area of the next index has the memory capacity capable of being written the hit cache data therein, moving the cache data to the redundant area of the next index, and when the redundant area of the next index does not have the memory capacity capable of being written the hit cache data therein, deleting the cache data stored in the memory area of the next index to generate an area capable of being written the hit cache data therein, and moving the hit cache data to the generated area.

15. The instruction-cache-system control method according to any one of claims 12 to 14, wherein a memory area of the instruction-cache data storage unit is divided into a plurality of memory banks, and
the method comprises specifying a memory bank in which the hit cache data is written, when requested cache data is hit, based on the controlled compression ratio, thereby activating the specified memory bank.

16. The instruction-cache-system control method according to claim 12, comprising virtually coupling redundant areas generated in a plurality of memory areas based on the controlled compression ratio, to compress and write new cache data in the coupled areas.

17. An information processing apparatus comprising:
an instruction cache system adopting an n-way set associative system in which an instruction code is cached as cache data; and
a main memory that supplies an instruction code to the instruction cache system, wherein
the instruction cache system comprises:
an instruction-cache data storage unit that stores cache data per index; and
an instruction cache controller that compresses and writes the cache data in the instruction-cache data storage unit, and controls a compression ratio of the written cache data, and wherein
the instruction cache controller calculates a memory capacity of a redundant area generated due to compression in a memory area belonging to an index, in which n pieces of cache data are written based on the controlled compression ratio, to compress and write new cache data in the redundant area based on the calculated memory capacity.

18. The information processing apparatus according to claim 17, wherein the new cache data written in the redundant area is cache data belonging to a same index, or prefetched cache data belonging to a next index.

19. The information processing apparatus according to claim 18, wherein when cache data requested from a processor hits the prefetched cache data, the instruction cache controller determines whether the redundant area in the memory area of an index next to the index in the memory area storing the cache data has a memory capacity capable of being written the hit cache data therein, based on a controlled compression ratio, and when the redundant area of the next index has the memory capacity capable of being written the hit cache data therein, the instruction cache controller moves the cache data to the redundant area of the next index, and when the redundant area of the next index does not have the memory capacity capable of being written the hit cache data therein, deletes the cache data stored in the memory area of the next index to generate an area capable of being written the hit cache data therein, and moves the hit cache data to the generated area.

20. The information processing apparatus according to claim 17, wherein the instruction cache controller virtually couples redundant areas generated in a plurality of memory areas based on the controlled compression ratio, and compresses and writes new cache data in the coupled areas.

\* \* \* \* \*